J. G. MOOMY.
PATCH FOR PNEUMATIC TIRES.
APPLICATION FILED OCT. 13, 1916.
1,219,578. Patented Mar. 20, 1917.
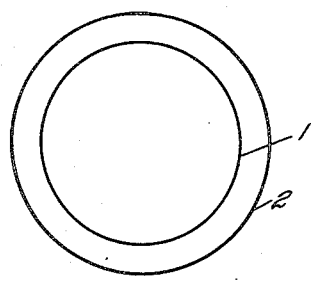
Fig-1
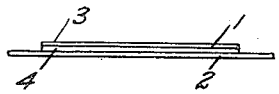
Fig-2
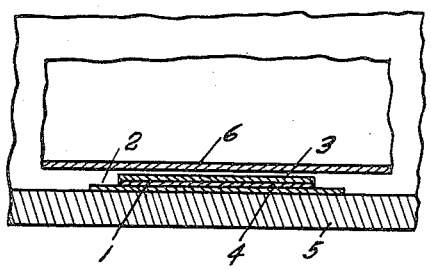 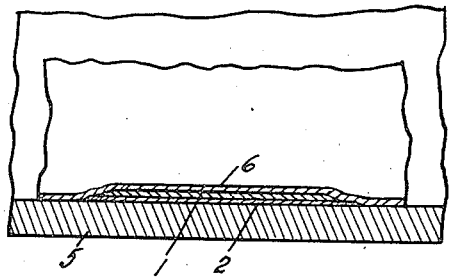
Fig-3 Fig-4
Inventor
Joseph G. Moomy
By
Attorney

UNITED STATES PATENT OFFICE.

JOSEPH G. MOOMY, OF ERIE, PENNSYLVANIA.

PATCH FOR PNEUMATIC TIRES.

1,219,578. Specification of Letters Patent. Patented Mar. 20, 1917.

Application filed October 13, 1916. Serial No. 125,369.

*To all whom it may concern:*

Be it known that I, JOSEPH G. MOOMY, a citizen of the United States, residing at Erie, in the county of Erie and State of Pennsylvania, have invented new and useful Improvements in Patches for Pneumatic Tires, of which the following is a specification.

This invention relates to patches for pneumatic tires and consists in certain improvements in the construction thereof as will be hereinafter fully described and pointed out in the claims.

The invention is particularly designed for patches for inner tubes for pneumatic tires. In making perfect patches for the tube it is desirable that the material of which they are formed be plastic so as to readily conform to the tube and adhesive so as to adhere perfectly to the tube. This can be accomplished under some circumstances by the utilization of a soft compound. The difficulty with these compounds is that they flow under the pressure of the tube so that there is an adhesion between the patch and the casing of the tire. One of the purposes of this invention is to provide a patch utilizing a soft material and preventing its adhesion to the outer casing. The invention also involves the idea of hardening the rubber compound after it is in place on the tube.

The invention is illustrated in the accompanying drawings as follows:—

Figure 1 shows a plan view of the patch.
Fig. 2 a side elevation.
Fig. 3 a section of a tire with a patch in place prior to inflation.
Fig. 4 a similar view showing the patch after it is subjected to the pressure of inflation.

1 marks the body of the patch and 2 a non-adhesive backing. The body of the patch preferably has a face of non-vulcanizing gum or rubber stock 3 and a layer 4 of vulcanizing stock non-vulcanized. The non-adhesive backing 2 preferably of glazed fabric extends beyond the periphery of the body of the patch 1. As shown in Fig. 3 the patch is placed on the tube 6 with the non-vulcanizing face 3 next the tube. This assures a perfect adhesion between the patch and the tube. The non-adhesive backing 2 is next the casing 5.

When the patch is subjected to pressure by the inflation of the tube as shown in Fig. 4, the soft stock forming the layers 3 and 4 has a tendency to flow and unless checked this would extend outwardly a supply of material whereby the tube and casing would become united. This adhesion often results in injury to the tube. In the present patch this flowing is limited within the bounds of the non-adhesive backing 2. This backing forms a dam preventing the outflowing of the material.

After the patch is in place and the tire subjected to use, the heat which is normally created in the tire in running will slowly vulcanize the layer 4, thus making a permanent vulcanized backing for the patch. The non-adhesive backing 2 may become detached or removed without effecting the final efficiency of the patch. I prefer, therefore, to form the vulcanizing layer 4 of a compound which will vulcanize under slight heat.

What I claim as new is:—

1. A patch for pneumatic tires comprising a layer of non-vulcanizing rubber stock forming the face of the patch; a layer of non-vulcanized vulcanizing stock; and a backing of non-adhesive material extending outside the edge of the layers of rubber stock and forming a dam with the patch in place between the tube and the casing and under pressure for confining the layers of rubber stock.

2. A patch for pneumatic tires comprising a layer of non-vulcanizing rubber stock forming the face of the patch; a layer of non-vulcanized vulcanizing stock; and a backing of non-adhesive material extending outside the edge of the layers of rubber stock and forming a dam with the patch in place between the tube and the casing and under pressure for confining the layers of rubber stock, each of the component parts being initially in a layer in a separate plane.

3. A patch for pneumatic tires comprising a layer of non-vulcanizing rubber stock forming the face of the patch; a layer of non-vulcanized vulcanizing rubber stock vulcanizing under heat; and a backing of non-adhesive material extending outside the edge of the layers of rubber stock and forming a dam with the patch in place between the tube and casing and under pressure for confining the layers of rubber stock.

4. A patch for pneumatic tires comprising a layer of non-vulcanizing rubber stock forming the face of the patch; a layer of non-vulcanized vulcanizing stock; and a backing of glazed fabric extending outside the edge of the layers of rubber stock and forming a dam with the patch in place between the tube and casing and under pressure for confining the layers of rubber stock.

In testimony whereof I have hereunto set my hand.

JOSEPH G. MOOMY.